United States Patent Office 3,752,789
Patented Aug. 14, 1973

3,752,789
ISOLATION OF A FLUOROPOLYMER
FROM A LATEX
Ausat Ali Khan, Newark, Del., assignor to E. I. du Pont
de Nemours and Company, Wilmington, Del.
No Drawing. Filed Aug. 20, 1971, Ser. No. 173,642
Int. Cl. C08f 1/13, 3/22, 15/06
U.S. Cl. 260—47 UA            12 Claims

ABSTRACT OF THE DISCLOSURE

Washed and dried fluoropolymer particles free of any harmful impurities can be prepared efficiently from a latex by a process which comprises the following steps:

(A) providing a latex of a normally solid fluoropolymer (e.g., an elastomeric copolymer of tetrafluoroethylene and a suitable ether or olefin monomer), (B) mixing the latex with a coagulating agent (e.g., magnesium chloride) and optionally with an aliphatic alcohol, (C) passing the resulting slurry into a first hot water bath while passing steam therein in contact with the fluoropolymer to form floating easy-to-filter fluoropolymer particles, (D) passing the floating fluoropolymer particles into at least a second hot water bath, and (E) removing water from the resulting floating and washed fluoropolymer particles, for example, by means of a filter and a drying oven.

BACKGROUND OF THE INVENTION

This invention relates to a process for isolating a fluoropolymer from other components of a fluoropolymer latex composition. In certain preferred embodiments of the process, the fluoropolymer is an elastomeric copolymer comprised of polymerized units of tetrafluoroethylene and a suitable olefin or a perfluoroalkyl perfluorovinyl ether.

Known methods for isolating a fluoropolymer from other components of a fluoropolymer latex are not entirely satisfactory. Known methods are especially unsatisfactory for preparing good quality washed and dried fluoropolymer particles from certain fluoroelastomer latex compositions obtained by emulsion polymerization of tetrafluoroethylene with one or two other monomers capable of forming therewith an elastomeric copolymer. Thus, there is a need in the fluoropolymer manufacturing art for a practical and efficient method for isolating fluoropolymers (including such fluoroelastomers) from other components of latex compositions.

SUMMARY OF THE INVENTION

Expressed broadly, the present invention provides a process for isolating a fluoropolymer from other components of a latex which comprises (A) providing a latex of a normally solid fluoropolymer, (B) mixing said latex with a coagulating agent until the latex is coagulated and an aqueous slurry of particles of the fluoropolymer is formed, (C) passing a stream of said slurry into a first water bath while the water bath is agitated and maintained at about 50–100° C., and while passing a stream of steam into the water bath and close enough to the stream of slurry so that the steam comes in contact with the fluoropolymer particles and causes them to float on the water bath, (D) passing from the top portion of the Step (C) water bath a stream of an aqueous slurry of the resulting floating fluoropolymer particles into a second water bath which is agitated and maintained at about 50–100° C., and (E) removing from the top portion of the last-mentioned water bath an aqueous slurry of the floating fluoropolymer particles and separating said particles from the water.

DESCRIPTION OF PREFERRED EMBODIMENTS

It is preferred in many applications that the novel process described above also includes a step between Steps (D) and (E) of passing from the top portion of the Step (D) water bath a stream of an aqueous slurry of the floating fluoropolymer particles into a third water bath which is agitated and maintained at about 50–100° C.

It is also preferred to feed a continuous stream of clean water into each water bath used in the process to enhance the removal of impurities from the polymer; excess water, of course, is passed through a suitable outlet. It is also preferred to carry out the process in a continuous manner wherein all the steps, or at least the steps following Step (B), are performed simultaneously and continuously until the desired quantity of product has been produced.

The latex provided in Step (A) is an aqueous dispersion of the polymer, the polymer being present in the form of extremely fine particles. The polymer is a normally solid fluoropolymer; thus, it is a solid (not a liquid) at commonly encountered room temperatures (e.g., about 10–35° C.). The latex can and often does contain one or more ingredients in addition to the fluoropolymer and water, for example, surface active agents, compounds remaining from the use of polymerization initiators and accelerators, and the like.

The latex can be prepared by any method known to be useful for the preparation of a fluoropolymer latex. In most cases I prefer to prepare it by emulsion polymerization. Known general practice can be followed in this technique, for example, by emulsifying the monomer components in a water solution of a suitable surface active agent (e.g., a salt of a perfluoroacid), and heating the resulting emulsion in a conventional polymerization apparatus in the presence of a suitable initiator and/or accelerator until the polymerization reaction has taken place.

In some very useful embodiments of the process, the fluoropolymer of the Step (A) latex is a copolymer of tetrafluoroethylene and a perfluoroalkyl perfluorovinyl ether having 1–5 carbon atoms in the alkyl group. Thus, the ether compound has the formula

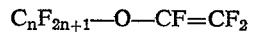

$$C_nF_{2n+1}\text{—}O\text{—}CF{=}CF_2$$

wherein $n$ is a number of 1–5. Preparation of a latex of this kind of copolymer is illustrated below in Example 4. An especially preferred type of such a copolymer is an elastomer having a tetrafluoroethylene/ether molar ratio of about 50:50 to 70:30. Also very useful is such a copolymer which also contains polymerized units of a curesite monomer, for example, about 0.5–5%, based on the moles of the copolymer of a perfluorophenoxypropylvinyl ether. The latter includes the 2-phenoxy and 3-phenoxy isomers. The use of this type of copolymer is illustrated below in Examples 1 and 2.

Another preferred type of fluoropolymer is a copolymer of (1) tetrafluoroethylene, (2) an olefin component selected from: an alkyl ($C_1$–$C_3$) vinyl ether, a mixture of ethylene and isobutylene in a molar ratio of about 50:50, and at least one member selected from: propylene, butene-1, and mixtures thereof which also contain up to about 50 mole percent of a component selected from ethylene and isobutylene, and (3) from zero to about 5%, based on the weight of the copolymer, of a cure-site monomer.

This copolymer can be made as described in U.S. Pat. 3,467,635 issued Sept. 16, 1969, to Brasen and Cleaver. One of the best cure-site monomers to use in making such a copolymer is an aryloxyalkyl vinyl ether of the formula

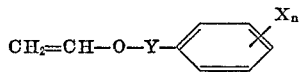

where Y is an alkylene radical of 2 to 4 carbon atoms, X is a radical of the group consisting of alkyl and alkoxy groups, there being no more than 4 carbon atoms in any one alkyl or alkoxy group, and $n$ being from 0 to 2. Such a copolymer is illustrated below in Example 5.

I usually prefer to use magnesium chloride as the coagulating agent in Step (B), especially when a fluoropolymer product having maximum heat stability is desired. Preferably about 7–15 parts by volume of an aqueous solution of magnesium chloride having a $MgCl_2 \cdot 6H_2O$ content of about 3–10% by weight are mixed with each 100 parts by volume of the latex. Other known coagulation means can also be used to coagulate the latex. For example, useful results can also be obtained by adding other compounds known to function as latex coagulating agents, including certain acids, trivalent metal salts, and other bivalent metal salts besides magnesium chloride. In order to avoid any unnecessary waste of polymer, it is preferred to use enough coagulating agent in Step (B) to coagulate substantially all of the polymer in the latex. The aqueous fluoropolymer composition or slurry resulting from step (B) tends to be a somewhat gelatinous mixture from which it is very difficult to isolate the polymer particles by filtration.

I also usually prefer to mix with the aqueous fluoropolymer composition, at any convenient point in the process before Step (C), a $C_1$–$C_5$ aliphatic alcohol in an amount sufficient to facilitate the separation from the polymer of preferred types of surface active agents (e.g., fluorocarbon surfactants) commonly used in preparing the latex. Preferably about 25–100 parts by volume of the alcohol are mixed with each 100 parts by volume of the fluoropolymer composition; however, useful results in some embodiments can also be obtained with more alcohol (e.g., up to about 100 parts) or with little or no alcohol. It is also possible to wash the polymer particles with alcohol after they are deposited on a filter. A convenient time to add the alcohol is between steps (B) and (C).

In Step (C), a stream of steam is passed into the first water bath in such a manner that the steam comes in contact with the fluoropolymer particles as the fluoropolymer slurry enters the water bath. This causes aggregation or agglomeration of the particles, and results in floating fluoropolymer particles which are easy to handle and process in subsequent steps (e.g., wherein the particles are transferred, washed, filtered, and dried). The steam inlet is preferably beneath the slurry inlet and preferably not more than four inches below the entering stream of slurry. A plurality of slurry streams and steam inlets can be used if desired. The steam temperature and inlet size can be selected so that the steam also functions as the major means of maintaining the desired bath temperature. The same or similar types of steam inlets can be used in subsequent water baths, or other known means can be used to maintain the desired bath temperature.

The Step (E) separation of the floating fluoropolymer particles from the water can be done by depositing the particles on a filter and then drying them (e.g., in a drying oven at about 100–158° C.) until their moisture content is about 0–10% by weight. A centrifuge or other known separation means can also be used. In applications where it is important to obtain a fluoropolymer that does not even contain traces of impurities, for example, when the molded fluoropolymer product will be used within the human body, one can employ such additional purifying means as washing the filtered particles with additional hot water, alcohol, or other materials capable of removing any residual impurities.

The process of this invention has beneficial utility for the preparation of washed and dried substantially pure fluoropolymer particles from a latex of the fluoropolymer. This process permits high quality fluoroelastomer particles to be made from various fluoroelastomer latexes in a practical and efficient manner.

The following examples illustrate the invention; all amounts are by weight unless otherwise indicated.

EXAMPLE 1

Fluoroelastomer particles of excellent quality are prepared from a latex by (1) providing five gallons of a latex (fluoroelastomer content of about 20%, the latex being the product of emulsion polymerization in the manner described below in the next paragraph, and the fluoroelastomer being a copolymer of (x) 63.5 moles of tetrafluoroethylene, (y) 36.5 moles of perfluoromethyl perfluorovinyl ether and (z) 0.5 mole of perfluoro 2-phenoxypropylvinyl ether; (2) stirring the latex (which is at 25° C.) while adding to it a coagulating agent at 25° C. and composed of 200 grams of $MgCl_2 \cdot 6H_2O$ dissolved in two liters of water, thereby coagulating the latex and forming an aqueous slurry or suspension of very fine particles of the fluoroelastomer; (3) adding to the resulting composition while stirring five gallons of denatured ethanol to facilitate the isolation of the fluoroelastomer from the fluorocarbon surfactant present in the step (1) latex; (4) passing a continuous stream of the resulting fluoroelastomer composition by means of a pump at the rate of two gallons per hour into a first water bath (tank of hot water) through a ¼ inch I.D. (inside diameter) pipe leading horizontally into the side of the water bath at a point located one inch from its bottom while the water bath is stirred, maintained at about 80° C., and provided with an input of about five gallons per hour of fresh water; (5) during step (4), passing a continuous stream of steam at 30 p.s.i. into the water bath through a ¼ inch I.D. pipe leading vertically into the bottom of the water bath just beneath the inlet of the pipe of step (4) whereby the steam comes in contact with the fluoroelastomer particles, causing them to agglomerate into lighter-than-water particles which float on the water bath; (6) passing from the top portion of the first water bath (of step 4) a continuous stream of the floating fluoroelastomer particles dispersed in water into a second water bath (same type as in step 4) in the manner described in step (4); (7) during the step (6) passing a continuous stream of steam into the second water bath in the manner described in step (5) at a rate that keeps the water bath at about 80° C.; (8) passing from the top portion of the second water bath a continuous stream of the floating fluoroelastomer particles dispersed in water into a third water bath (same type as in step 4) in the manner described in step (4); (9) during step (8), passing a continuous stream of steam into the third water bath in the manner described in step (5) at a rate that keeps the water bath at about 80° C.; (10) passing from the top portion of the third water bath a continuous stream of the floating fluoroelastomer particles dispersed in water into a filtration apparatus where the fluoroelastomer particles (now in substantially pure and easy-to-filter form) are deposited on an 80 mesh stainless steel screen to form a layer of wet fluoroelastomer crumb having a water content of about 50%; (11) placing the wet crumb in a Büchner funnel attached to a vacuum flask and reducing the water content of the wet crumb to about 15%; and (12) reducing the water content of the crum to about 4% by means of a drying oven in which the air at 100° C. is circulated by a blower. The residual moisture serves as a processing aid while milling the fluoroelastomer and prevents any undue build-up of static charge.

The latex of step (1) is prepared by (a) providing a 3800 ml. stainless steel autoclave reactor equipped with a heating jacket, stirrer, suitable inlets for the ingredients, and outlet for the reaction products; (b) introducing into the reactor 3700 ml. of an aqueous composition prepared by dissolving the following ingredients in four liters of water: 20 grams of ammonium persulfate, 50 grams of fluorocarbon surfactant (ammonium perfluorooctanoate) and 72 grams of disodium phosphate ($Na_2HPO_4 \cdot 7H_2O$); (c) heating the contents of the reactor to 60° C. while pumping in additional water until it is full and the pressure therein is 600 p.s.i.g. static pressure; and then carrying out the following steps in a continuous manner for the continuous preparation of the latex; (d) feeding each of the monomers into the reactor at 600 p.s.i.g. and 80° C., the gaseous monomers (x and y of step 1) being fed at a rate of 2.5 moles per hour for monomer x and 1.8 moles per hour for monomer y, by way of a rotometer, diaphragm compressor, and supply line which has been flushed with the monomer, the liquid monomer (z of step 1) being fed as a 50% solution in $CF_2ClCFCl_2$ ("Freon" 113) at a rate of 10 ml. of solution per hour; the monomers and proportions thereof being as indicated in step (1) of the previous paragraph; (e) feeding into the top of the reactor at a rate of 600 ml. per hour an aqueous composition prepared by mixing 6 grams of ammonium perfluorooctanoate, 9 grams of dibasic sodium phosphate, 0.6 gram of monobasic sodium phosphate, 5.2 grams of ammonium persulfate, and enough water to make the total volume of composition equal to 600 ml.; (f) feeding into the bottom of the reactor at a rate of 600 ml. per hour a composition prepared by dissolving 2.2 grams of sodium sulfite in 600 ml. of water; (g) passing the resulting crude latex (latex formed in the reactor plus some unreacted monomer components) through a conduit leading from the top of the reactor at the same rate as the total ingredients of the reaction mixture are introduced in steps (d–f); and (h) passing the crude latex through a back-pressure regulator into a conventional degasser means where unreacted monomer separates from the latex. The fluoroelastomer of the latex has an inherent viscosity of 0.86. The inherent viscosities herein are measured at 30° C. as a 0.2% solution in a 99:1 mixture of 2,3-dichlorooctafluorobutane and diglyme. The fluoroelastomer particles in the latex are extremely small and they are very difficult or impossible to isolate by a practical filtration method.

The fluoroelastomer crumb prepared in Example 1 is substantially free of impurities except for the intentional moisture content. The fluoroelastomer has been isolated from other components of the latex in a practical and efficient manner. The surfactant content is found to be close to 0 (small trace equal to less than 0.1%) when the product is subjected to a conventional infrared analysis. The fluoroelastomer product can be mixed on a rubber mill with ingredients known to be useful in preparing curable fluoroelastomer compositions (for example, carbon black, divalent metal oxides, and curing agents). The resulting compositions can be molded into useful cured fluoroelastomer products by using any suitable apparatus known to be useful for the manufacture of cured molded articles or sheet materials from curable fluoroelastomer compositions. Problems with poor heat stability (for example, blowing during post cure at about 200–320° C.) that would be encountered if the fluoroelastomer contained harmful amounts of surfactant that were present in the latex are not encountered.

EXAMPLE 2

High quality fluoroelastomer particles substantially free of surfactant and other impurities, and useful for the manufacture of cured elastomer articles, are prepared in the manner described in Example 1 except the fluoroelastomer of step (1) is a copolymer of (x) 62.2 moles of tetrafluoroethylene, (y) 36.0 moles of perfluoromethyl perfluorovinyl ether, and (z) 1.8 mole of perfluoro 3-phenoxypropyl ether.

This fluoroelastomer has an inherent viscosity of 0.52. In preparing the latex, suitable adjustments which will be apparent to one skilled in the art are made in the monomer feed rates to obtain the copolymer of the present example.

EXAMPLE 3

Substantially pure fluoroelastomer particles useful for the manufacture of cured molded articles are prepared in the manner described in Example 2 except the fluoroelastomer is a copolymer of 66 moles of tetrafluoroethylene, 33 moles of perfluoromethyl perfluorovinyl ether and one mole of perfluoro[2-(fluorosulfonylethoxy)propylvinyl ether].

EXAMPLE 4

Substantially pure fluoroelastomer particles are prepared in the manner described in Example 1 except the fluoroelastomer is a copolymer of 60 moles of tetrafluoroethylene and 40 moles of perfluoromethyl perfluorovinyl ether; and the latex is prepared as follows:

A solution of 13.8 grams of dibasic sodium phosphate ($Na_2HPO_4 \cdot 7H_2O$), 15 grams of ammonium perfluorooctanoate, and 4 grams of ammonium persulfate $$[(NH_4)_2S_2O_8]$$

in 1886 ml. of water is put in a one-gallon stirred autoclave. After sealing the autoclave, the solution is heated to 50° C.; and a mixture of 40 mole percent of perfluoromethyl perfluorovinyl ether and 60 mole percent of tetrafluoroethylene is introduced into the autoclave until a pressure of 140 p.s.i.g. is attained. While the monomer gases are being fed to the autoclave, 50 ml. of catalyst solution containing 1.0 gram of sodium sulfite and 20.0 mgm. of copper sulfate ($CuSO_4 \cdot 5H_2O$) dissolved in water is added at 140 p.s.i.g. pressure. Over a period of five hours, the pressure is maintained at 140 p.s.i.g. by addition of a suitable amount of the 40:60 monomer mixture. During this time, a total of 60 ml. of catalyst solution containing 1.2 grams of sodium sulfite and 24 mgm. of copper sulfate is added in increments of 5 ml. The autoclave is vented, and a 2744 gram batch of latex is obtained.

EXAMPLE 5

Substantially pure fluoroelastomer particles are prepared in the manner described in Example 1 except (a) the fluoroelastomer is the copolymer of 55 moles of tetrafluoroethylene, 44 moles of propylene, and one mole of 2-phenoxyethyl vinyl ether; (b) the latex is prepared in the manner described in Example 2 of U.S. Pat. 3,579,474 issued May 18, 1971, to R. S. Ro, and (c) the coagulating agent used in step (2) is one liter of 10% hydrochloric acid.

I claim:

1. A process for isolating a fluoropolymer from other components of a latex which comprises
   (A) providing a latex of a normally solid fluoropolymer,
   (B) mixing said latex with a coagulating agent until the latex is coagulated and an aqueous slurry of particles of the fluoropolymer is formed,
   (C) passing a stream of said slurry into a first water bath while separately the water bath is agitated and maintained at about 50–100° C., and while passing a stream of steam into the water bath and close enough to the stream of slurry so that the steam, after it enters the water bath, comes in contact with the fluoropolymer particles and causes them to float on the water bath,
(D) passing from the top portion of the Step (C) water bath a stream of an aqueous slurry of the resulting floating fluoropolymer particles into a second water bath which is agitated and maintained at about 50–100° C., and
(E) removing from the top portion of the last-mentioned water bath an aqueous slurry of the floating fluoropolymer particles and separating said particles from the water.

2. A process according to claim 1 which also comprises a step between steps (D) and (E) of passing from the top portion of the Step (D) water bath a stream of an aqueous slurry of the floating fluoropolymer particles into a third water bath which is agitated and maintained at about 50–100° C.

3. A process according to claim 2 wherein said fluoropolymer is a copolymer of tetrafluoroethylene and a perfluoroalkyl perfluorovinyl ether having 1–5 carbon atoms in the alkyl group.

4. A process according to claim 3 wherein said copolymer is an elastomer having a tetrafluoroethylene/ether molar ratio of about 50:50 to 70:30.

5. A process according to claim 2 wherein said fluoropolymer is a copolymer of
(1) tetrafluoroethylene,
(2) an olefin component selected from: an alkyl ($C_1$–$C_3$) vinyl ether, a mixture of ethylene and isobutylene in a molar ratio of about 50:50, and at least one member selected from: propylene, butene-1, and mixtures thereof which also contain up to about 50 mole percent of a component selected from ethylene and isobutylene, and
(3) from zero to about 5%, based on the weight of the copolymer, of a cure-site monomer.

6. A process according to claim 5 wherein component (3) is an aryloxyalkyl vinyl ether of the formula

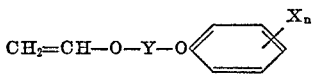

where Y is an alkylene radical of 2 to 4 carbon atoms, X is a radical of the group consisting of alkyl and alkoxy groups, there being no more than 4 carbon atoms in any one alkyl or alkoxy group and $n$ being from 0 to 2.

7. A process according to claim 2 wherein said fluoropolymer is a copolymer of tetrafluoroethylene, a perfluoroalkyl perfluorovinyl ether having 1–5 carbon atoms in the alkyl group, and about 0.5–5%, based on the moles of copolymer, of a perfluoro phenoxypropylvinyl ether.

8. A process according to claim 2 wherein the coagulating agent of Step (B) is magnesium chloride.

9. A process according to claim 8 wherein in Step (B) about 7–15 parts by volume of an aqueous solution of magnesium chloride having a $MgCl_2 \cdot 6H_2O$ content of about 3–10% by weight are mixed with each 100 parts by volume of the latex, and in Step (C) the water bath is maintained at about 70–90° C.

10. A process according to claim 2 wherein prior to Step (C) about 25–100 parts by volume of a $C_1$–$C_5$ aliphatic alcohol are mixed with each 100 parts by volume of the aqueous fluoropolymer composition.

11. A process according to claim 2 wherein Step (D) also comprises passing a stream of steam into the water bath in such a manner that the steam comes in contact with the fluoropolymer particles.

12. A process according to claim 2 wherein Step (E) the fluoropolymer particles are filtered from the slurry and then dried until their moisture content is about 0–10% by weight.

References Cited
UNITED STATES PATENTS

| | | | |
|---|---|---|---|
| 2,458,636 | 1/1949 | Plambeck, Jr. | 260—29.6 |
| 2,647,103 | 7/1953 | Griffith | 260—63 |
| 2,673,193 | 3/1954 | Kolvoort | 260—92.8 |

JOSEPH L. SCHOFER, Primary Examiner
C. A. HENDERSON, Jr., Assistant Examiner

U.S. Cl. X.R.
260—29.6 F, 80.76, 87.5 A, B, G, 87.7, 92.1, 96 R